United States Patent
Slavitch et al.

(10) Patent No.: US 10,194,314 B2
(45) Date of Patent: Jan. 29, 2019

(54) METHOD AND SYSTEM FOR IDENTIFYING AN ENTITY IN A MOBILE DEVICE ECOSYSTEM

(75) Inventors: Michael Nickola Slavitch, Ottawa (CA); Eugene Chin, Oakville (CA); Gurdev S. Rai, Orangeville (CA); Bruno R. Preiss, Waterloo (CA); Kenneth Cyril Schneider, Blue Mountains (CA)

(73) Assignee: BlackBerry Limited, Waterloo (CA)

( * ) Notice: Subject to any disclaimer, the term of this patent is extended or adjusted under 35 U.S.C. 154(b) by 156 days.

(21) Appl. No.: 13/105,315

(22) Filed: May 11, 2011

(65) Prior Publication Data

US 2012/0102173 A1 Apr. 26, 2012

Related U.S. Application Data

(60) Provisional application No. 61/405,795, filed on Oct. 22, 2010.

(51) Int. Cl.
 *H04W 8/26* (2009.01)
 *H04L 29/12* (2006.01)

(52) U.S. Cl.
 CPC ......... *H04W 8/26* (2013.01); *H04L 29/12801* (2013.01); *H04L 29/12943* (2013.01); *H04L 61/6004* (2013.01); *H04L 61/6072* (2013.01)

(58) Field of Classification Search
 CPC ....... G06F 17/30011; G06F 2221/0706; G06F 17/30876; H04L 63/0876; H04L 61/3085; H04L 63/102; H04L 63/104; H04L 49/357; H04L 2209/60; H04L 63/0428; H04L 65/1006; H04L 2463/101; H04L 63/06;

(Continued)

(56) References Cited

U.S. PATENT DOCUMENTS 5,475,681 A  12/1995  White et al.
5,848,242 A *  12/1998  Behaghel ............... H04L 45/04
                                                 370/392

(Continued)

FOREIGN PATENT DOCUMENTS

GB  2411317 A  8/2005
GB  2415855 A  1/2006
WO  2009009624 A2  1/2009

OTHER PUBLICATIONS

Leach "A Universally Unique IDentifier (UUID) URN Namespace," Jul. 2005, pp. 1-36. http://www.ietf.org/rfc/rfc4122.txt.*

(Continued)

*Primary Examiner* — Douglas B Blair
*Assistant Examiner* — Linh T. Nguyen
(74) *Attorney, Agent, or Firm* — Ridout and Maybee LLP

(57) ABSTRACT

A system and method of assigning an identifier to an entity operating within a mobile device ecosystem including a domain are provided. The method comprises: obtaining an identifier of the entity which uniquely identifies the entity within the domain, the identifier of the entity including length information identifying the length of identifier of the entity; obtaining an identifier of the domain within which the identifier of the entity is unique; and combining the identifier of the entity with the identifier of the domain to create a globally unique identifier of the entity which is globally unique in the mobile device ecosystem.

19 Claims, 8 Drawing Sheets

(58) Field of Classification Search
CPC ......... H04L 63/08; H04L 9/083; H04L 29/06;
H04L 29/12886; H04L 45/00; H04L
49/3009; H04L 49/354; H04L 51/28;
H04L 61/6045; H04L 63/126; H04L
67/1065; H04L 69/329; H04L 12/2803;
H04L 12/56; H04L 29/06176; H04L
29/12113; H04L 29/12254; H04L
29/12584; H04L 29/12594; H04L
29/12801; H04L 29/12839; H04L
29/12858; H04L 29/12877; H04L 61/106;
H04L 61/1541; H04L 61/2007; H04L
69/08; H04L 69/22; H04L 9/0825; H04L
12/2807; H04L 12/6418; H04L
2012/2849; H04L 2463/062; H04L
29/12066; H04L 29/1216; H04L
29/12216; H04L 29/1299; H04L 41/0668;
H04L 41/0809; H04L 41/0813; H04L
43/08; H04L 41/08; H04L 45/02; H04L
45/22; H04L 12/2876; H04L 29/12283;
H04L 29/12933; H04L 61/2061; H04L
61/6068; H04L 65/1073; H04L 67/30;
H04L 65/1016; H04L 65/103; H04L
29/06027; H04L 12/2805; H04L
12/40097; H04L 12/40117; H04L 12/66;
H04L 41/0803; H04L 67/10; H04L
67/104; H04L 12/14; H04L 63/10; H04L
9/32; H04L 47/20; H04L 12/1407; H04L
65/80; H04L 9/0866; H04L 67/14; H04L
61/303; H04L 29/12943; H04L 61/6004;
H04L 61/6072; H04L 67/303; H04M
3/42059; H04M 15/56; H04M 7/006;
H04M 2201/36; H04M 2203/1058; H04M
3/42042; H04M 3/42195; H04M 3/4878;
H04M 3/51; H04M 3/5175; H04M
3/5183; H04M 3/5191; H04M 7/003;
H04M 15/30; H04M 15/41; H04M 15/43;
H04M 15/44; H04M 15/64; H04M 15/68;
H04M 15/765; H04M 15/8016; H04M
15/8038; H04M 15/83; H04M 15/61;
H04M 15/80; H04M 15/00; H04M 3/493;
H04M 15/58; H04M 15/88; H04W 8/18;
H04W 80/04; H04W 88/18; H04W 8/005;
H04W 76/021; H04W 8/26; H04W 12/06;
H04W 88/02; H04W 76/02; H04W 76/11;
H04W 8/004
USPC ....... 709/223, 224, 225, 250, 220, 245, 203;
370/254, 395.3, 395.52, 393, 392;
455/415
See application file for complete search history.

(56) References Cited

U.S. PATENT DOCUMENTS

| | | | | |
|---|---|---|---|---|
| 6,904,450 | B1* | 6/2005 | King | G06F 17/3089 |
| | | | | 707/999.01 |
| 7,093,014 | B2* | 8/2006 | Nino | H04L 67/16 |
| | | | | 709/219 |
| 7,228,359 | B1* | 6/2007 | Monteiro | G06F 15/16 |
| | | | | 709/245 |
| 7,398,310 | B1* | 7/2008 | Kuehl et al. | 709/224 |
| 7,571,468 | B1* | 8/2009 | Williams | 726/9 |
| 8,121,136 | B2* | 2/2012 | Asati et al. | 370/401 |
| 8,224,978 | B2* | 7/2012 | Driscoll et al. | 709/229 |
| 8,265,281 | B2* | 9/2012 | Wang et al. | 380/270 |
| 8,340,017 | B2* | 12/2012 | Buckley et al. | 370/328 |
| 8,898,759 | B2* | 11/2014 | Schultz | G06F 21/44 |
| | | | | 709/203 |
| 2001/0041047 | A1* | 11/2001 | Kawajiri | H04N 5/782 |
| | | | | 386/231 |
| 2003/0033544 | A1* | 2/2003 | King et al. | 713/201 |
| 2003/0037177 | A1* | 2/2003 | Sutton et al. | 709/316 |
| 2003/0041141 | A1* | 2/2003 | Abdelaziz et al. | 709/223 |
| 2003/0172051 | A1 | 9/2003 | Ouchi | |
| 2003/0177356 | A1 | 9/2003 | Abela | |
| 2004/0055015 | A1* | 3/2004 | Lesenne et al. | 725/110 |
| 2004/0139187 | A1* | 7/2004 | Park | H04L 12/2803 |
| | | | | 709/223 |
| 2005/0044194 | A1* | 2/2005 | Baldiga | H04L 29/06 |
| | | | | 709/223 |
| 2005/0081044 | A1* | 4/2005 | Giles et al. | 713/182 |
| 2005/0138192 | A1* | 6/2005 | Encarnacion et al. | 709/230 |
| 2005/0197101 | A1* | 9/2005 | Gupta | H04L 29/1216 |
| | | | | 455/410 |
| 2005/0239447 | A1* | 10/2005 | Holzman | H04L 63/08 |
| | | | | 455/414.3 |
| 2005/0271047 | A1* | 12/2005 | Huonder et al. | 370/389 |
| 2006/0031230 | A1* | 2/2006 | Kumar | G06F 17/30194 |
| 2006/0041595 | A1* | 2/2006 | Taguchi | G06F 3/0605 |
| 2006/0074876 | A1* | 4/2006 | Kakivaya | G06F 17/30067 |
| 2006/0168243 | A1* | 7/2006 | Zou | H04L 69/16 |
| | | | | 709/227 |
| 2006/0218234 | A1* | 9/2006 | Deng | H04L 51/066 |
| | | | | 709/206 |
| 2007/0153770 | A1* | 7/2007 | Goyal et al. | H04L 12/66 |
| | | | | 370/395.52 |
| 2007/0180081 | A1* | 8/2007 | Okmianski et al. | 709/223 |
| 2007/0287425 | A1* | 12/2007 | Bates | H04W 4/12 |
| | | | | 455/412.1 |
| 2008/0010366 | A1* | 1/2008 | Duggan | 709/223 |
| 2008/0112362 | A1* | 5/2008 | Korus | H04L 29/12811 |
| | | | | 370/331 |
| 2008/0133414 | A1* | 6/2008 | Qin et al. | 705/50 |
| 2008/0134307 | A1* | 6/2008 | Ashkenazi et al. | 726/6 |
| 2008/0189250 | A1* | 8/2008 | Cha | G06F 21/10 |
| 2008/0263189 | A1* | 10/2008 | Begorre | H04L 63/1466 |
| | | | | 709/223 |
| 2008/0281855 | A1* | 11/2008 | Lange et al. | G06F 7/00 |
| 2009/0025059 | A1* | 1/2009 | Wang et al. | 726/3 |
| 2009/0135758 | A1* | 5/2009 | Alper | H04L 29/12113 |
| | | | | 370/328 |
| 2009/0274062 | A1* | 11/2009 | Yan | H04L 29/12066 |
| | | | | 370/254 |
| 2009/0298478 | A1* | 12/2009 | Tyhurst et al. | 455/414.1 |
| 2010/0011446 | A1 | 1/2010 | Klucher et al. | |
| 2010/0022240 | A1* | 1/2010 | Skinner | G06F 15/02 |
| | | | | 455/435.1 |
| 2010/0167734 | A1* | 7/2010 | Jones | H04L 29/12622 |
| | | | | 455/435.1 |
| 2011/0025469 | A1* | 2/2011 | Erdmann | H04L 12/2809 |
| | | | | 340/10.1 |
| 2015/0113172 | A1* | 4/2015 | Johnson | H04L 67/34 |
| | | | | 709/245 |

OTHER PUBLICATIONS

Oleksandr Bodriagov "A secure mobile phone-based interactive logon in Windows", Jun. 2010, pp. 1-104 http://www.europeana.eu/portal/record/9200111/445B13E737708095EE055D8AF53B26915757C83C.html.*

Leach et al.; A Universally Unique IDentifier (UUID) URN Namespace; Jul. 2005; Networking Group Request for Comment 4122; pp. 1-32 (Year: 2005).*

Extended European Search Report issued on corresponding European patent application No. 11165744.1; dated Jan. 20, 2012; 6 pages.

Leach, et al.; Network Working Group; Standards Track: "A Universally Unique IDentifier (UUID) URN Namespace"; pp. 1-32; Jul. 2005.

MA, Cathy—Canadian Intellectual Property Office, "Examiner's Requisition" for Canadian Patent Application No. 2,753,012 dated May 15, 2013, Canada.

(56) References Cited

OTHER PUBLICATIONS

Canadian Intellectual Property Office, "A Requisition by the Examiner in Accordance with Subsection 30(2) of the Patent Rules" in respect of Application No. 2,753,012, Dec. 1, 2014.

Leach et al., "A Universally Unique Identifier (UU/O) URN Namespace", IETF, RFC 4122, pp. 1-32, http://www.ietf.org/rfc/rfc4122.txt, Jul. 2005.

European Patent Office, "Communication pursuant to Article 94(3) EPC" for corresponding European Patent Application No. 11 165 744.1 dated Nov. 27, 2015.

Shi, Minghui—Canadian Intellectual Property Office, "Examiner's Requisition" for corresponding Canadian Patent Application No. 2,753,012, dated Jul. 29, 2015.

Communication Pursuant to Article 94(3) EPC; EP 11165744.1; dated Oct. 13, 2017.

Office Action; CA Application No. 2753012; dated Nov. 20, 2017.

Wikipedia—Concatenation; http://en.wikipedia.org/wiki/Concatenation; retrieved Mar. 19, 2018; 4 pages.

Wikipedia—Flash Function; http://en.wikipedia.org/wiki/Hash_function; retrieved Mar. 19, 2018; 7 pages.

Wikipedia—Active Directory; http://en.wikipedia.org/wiki/Active_Directory; retrieved Mar. 19, 2018; 9 pages.

MA, Cathy—Canadian Intellectual Property Office, "Examiner's Requisition" for Canadian Patent Application No. 2,753,012 dated Mar. 6, 2014.

\* cited by examiner

METHOD AND SYSTEM FOR IDENTIFYING AN ENTITY IN A MOBILE DEVICE ECOSYSTEM

RELATED APPLICATION

This application claims priority from and the benefit of the filing date of U.S. Provisional Application No. 61/405,795 filed on Oct. 22, 2010, which is incorporated herein by reference.

TECHNICAL FIELD

The present disclosure relates generally to mobile device ecosystems and, more particularly, to systems and methods for identifying entities within a mobile device ecosystem.

BACKGROUND

Mobile devices, such as tablet computing devices, may operate within a larger system. The larger system may allow the mobile devices to access services which may be provided, at least in part, by servers operating within the system.

The larger system within which the mobile device operates may, for example, be referred to as a mobile device ecosystem. The mobile device ecosystem may include entities such as services, subscribers, applications, mobile devices, data objects, etc. The mobile device ecosystem may include resources which are provided locally on the mobile device and resources which are provided, in whole or in part, by other devices, systems or servers.

As the number of entities added to the ecosystem increases (for example, as new mobile devices are added to the ecosystem), the complexity of the ecosystem increases and communications between multiple entities of the system may become more difficult.

BRIEF DESCRIPTION OF THE DRAWINGS

Like reference numerals are used in the drawings to denote like elements and features.

DETAILED DESCRIPTION OF EXAMPLE EMBODIMENTS

In one aspect, the present application provides a method of assigning an identifier to an entity operating within a mobile device ecosystem. The method comprises: obtaining, at an identity management system, an identifier of the entity which uniquely identifies the entity within a domain which is part of the mobile device ecosystem, the identifier of the entity including length information identifying the length of the identifier of the entity; obtaining, at the identity management system, an identifier of the domain within which the identifier of the entity is unique; and combining the identifier of the entity with the identifier of the domain to create a globally unique identifier of the entity which is globally unique in the mobile device ecosystem.

In another aspect, the present application provides a system for assigning an identifier to an entity operating within a mobile device ecosystem. The system includes a processor and a memory storing an identity management system module. The identity management module is configured to cause the processor to: obtain an identifier of the entity which uniquely identifies the entity within a domain which is part of the mobile device ecosystem, the identifier of the entity including length information identifying the length of the identifier of the entity; obtain an identifier of the domain within which the identifier of the entity is unique; and combine the identifier of the entity with the identifier of the domain to create a globally unique identifier of the entity which is globally unique in the mobile device ecosystem.

In yet a further aspect, the present application provides a mobile device comprising a processor and a memory. The memory is configured to cause the processor to: obtain an identifier of an entity which uniquely identifies the entity within a domain, the identifier of the entity including length information identifying the length of identifier of the entity; obtain an identifier of the domain within which the identifier of the entity is unique; and combine the identifier of the entity with the identifier of the domain to create a globally unique identifier of the entity.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

Figure 1:
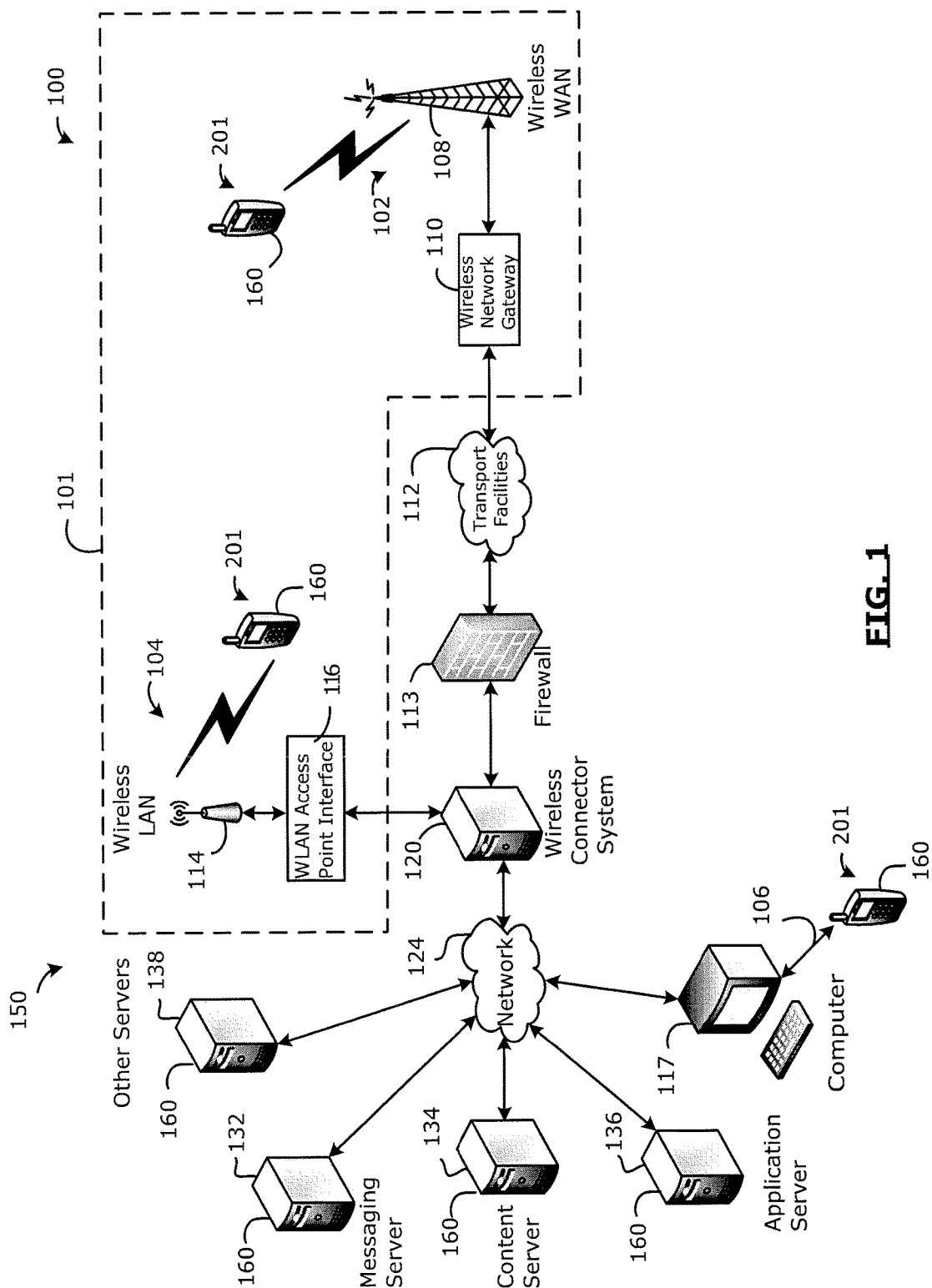
FIG. 1 is a block diagram of a communication system in which example embodiments of the present disclosure can be applied.

The present application describes, among other things, a mobile device 201 (FIG. 1) which operates in a mobile device ecosystem 150 (FIG. 1). The mobile device ecosystem 150 (FIG. 1) is a software system in which the mobile device 201 (FIG. 1) operates.

The mobile device ecosystem 150 (FIG. 1) may include entities such as services, subscribers, applications 224 (FIG. 2), mobile devices 201 (FIG. 1), data objects, etc. The mobile device ecosystem 150 (FIG. 1) may include resources which are provided locally on the mobile device 201 (FIG. 1) and resources which are provided, in whole or in part, by other devices, systems or servers.

The mobile device 201 (FIG. 1) may, in some example embodiments, be a mobile wireless device having mobile communication capabilities such as, for example, data communication capabilities. However, depending on the functionality of the device 201 (FIG. 1), in various example embodiments, the device 201 (FIG. 1) may be a mobile wireless device, a data communication device, a multiple-mode communication device configured for both data and voice communication, a smartphone, a mobile telephone or a PDA (personal digital assistant) enabled for wireless communication, or a computer system with a wireless modem. It will be appreciated that, in some example embodiments, the systems and methods presented herein may be applied to an electronic device that does not, necessarily, have communication capabilities; such as, for example a PDA which is not enabled for communication. In some example embodiments, the device 201 (FIG. 1) may be a global positioning system (GPS) device.

In at least some example embodiments, the mobile device 201 (FIG. 1) is a tablet computing device. The tablet computing device (which may also be referred to as a "tablet computer", a "tablet", or a "tablet device") is a computer which uses a touch screen as a primary input device instead of a keyboard or mouse.

Accordingly, the mobile device 201 (FIG. 1) may, in various instances throughout this disclosure, be referred to as a device 201, a mobile communication device 201, an electronic device 201, or a tablet computing device 201.

System Overview

In order to facilitate an understanding of one possible environment in which example embodiments described herein can operate, reference is first made to FIG. 1 which shows in block diagram form a communication system 100 in which example embodiments of the present disclosure can be applied.

The communication system 100 includes a number of mobile communication devices 201 which may be connected to the remainder of the system 100 in any of several different ways. The communication system 100, together with the mobile communication devices 201 within the communication system 100, provide a mobile device ecosystem 150 for the mobile device 201.

Accordingly, several instances of mobile communication devices 201 are depicted in FIG. 1 employing different example ways of connecting to system 100. Mobile communication devices 201 are connected to a wireless network 101 which may include one or more of a Wireless Wide Area Network (WWAN) 102 and a Wireless Local Area Network (WLAN) 104 or other suitable network arrangements. In some example embodiments, the mobile communication devices 201 are configured to communicate over both the WWAN 102 and WLAN 104, and to roam between these networks. In some example embodiments, the wireless network 101 may include multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some example embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA1010, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further include a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some example embodiments, the network 124 may be realized using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 includes a wireless network which, in some example embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other example embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server), a content server 134 for providing content such as Internet content or content from an organization's internal servers, and application servers 136 for implementing server-based applications such as instant messaging (IM) applications to mobile communication devices 201 and other servers 138.

The wireless connector system 120 typically provides a secure exchange of data (e.g., email messages, personal information manager (PIM) data, and IM data) with the mobile communication devices 201. In some example embodiments, communications between the wireless connector system 120 and the mobile communication devices 201 are encrypted. In some example embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some example embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 102 to the wireless connector system 120. The wireless connector system 120 then sends the data packets to the appropriate connection point such as the messaging server 132, content server 134, application servers 136 or other servers 138 which may provide other services. Conversely, the wireless connector system 120 sends data packets received, for example, from the messaging server 132, content server 134, application server 136 or other servers 138 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134, application server 136 and other servers 138.

The network 124 may include a private local area network, metropolitan area network, wide area network, the public Internet or combinations thereof and may include virtual networks constructed using any of these, alone, or in combination.

A link 106 may be provided for exchanging information between the mobile communication device 201 and a host computer 117 connected to a network 124, such as the Internet. The link 106 may include one or both of a physical interface and short-range wireless communication interface. The physical interface may include one or combinations of an Ethernet connection, Universal Serial Bus (USB) connection, Firewire™ (also known as an IEEE 1394 interface) connection, or other serial data connection, via respective ports or interfaces of the mobile communication device 201 and host computer 117. In one example embodiment, the link 106 is a USB connection to the mobile communication device 201.

The device 201 may access other servers 138 instead of or in addition to the messaging server 132, content server 134 and/or application server 136. The other servers 138 may provide other services to the device 201. For example, the other servers 138 may include a map server which may store map data such as, for example, map images which may include satellite images or a traditional visual representation of a geographical area. In at least some example embodiments, map data which is stored on the map server may be accessed by the mobile communication device 201. A mapping application running on the device 201 may display the map data on a display of the device 201. The mapping application running on the device 201 may request map data as such data is required. For example, when the mapping application needs to display map data for an area which it has not previously displayed, the mapping application may request map data from the map server.

In some example embodiments, the other servers 138 may include a digital good store server. The digital good store server may store content such as applications, audio files, video files, electronic books, application plug-ins and add-ons, etc. In at least some example embodiments, a digital good store application operating on the device 201 may be configured to access the digital good store server and permit content to be purchased and delivered to the device 201.

The above-described communication system is provided for the purpose of illustration only. The above-described communication system includes one possible communication network configuration of a multitude of possible configurations for use with the mobile communication devices 201. The teachings of the present disclosure may be employed in connection with other types of networks and associated devices that are effective in implementing or facilitating wireless communication. Suitable variations of the communication system will be understood to a person of skill in the art and are intended to fall within the scope of the present disclosure.

The communication system 100, or parts thereof, may collectively provide a mobile device ecosystem 150 for the mobile device 201. The mobile device ecosystem 150 may include a plurality of entities 160. The entities may be comprised of sub-systems which operate within the larger ecosystem 150. For example, the entities 160 may include mobile devices 201, an application server 136, a content server 134, a messaging server 132 and/or other servers 138.

As will be explained below with reference to FIG. 2, the entities 160 may also include applications and data objects associated with mobile devices 201 or other entities such as servers.

The entities 160 may also include subscribers (users), networks, and/or groups. Other types of entities are also possible.

Example Mobile Device

Figure 2:
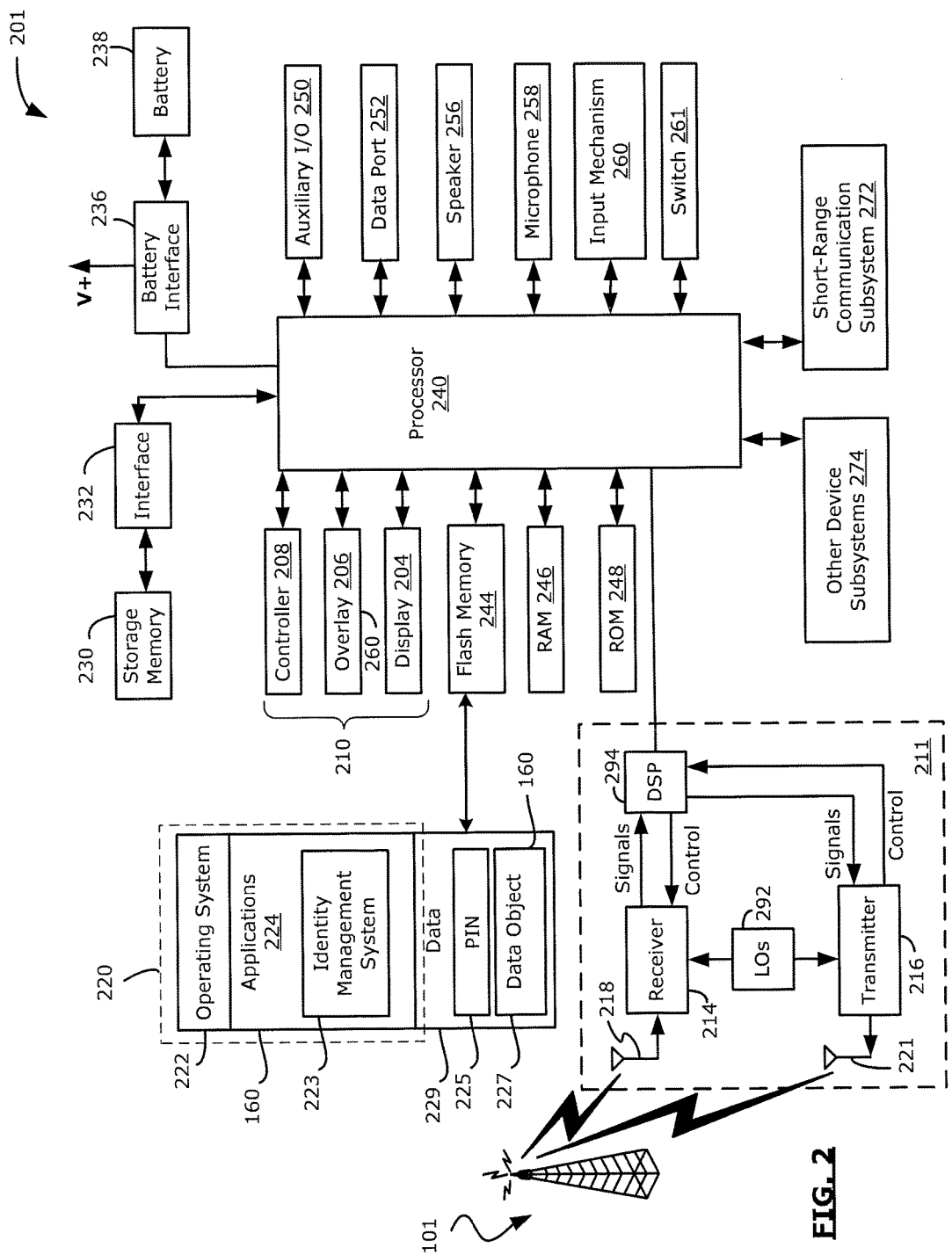
FIG. 2 is a block diagram illustrating a mobile device in accordance with example embodiments of the present disclosure.

Reference is now made to FIG. 2 which illustrates a block diagram of a mobile device 201 in which example embodiments described in the present disclosure can be applied. In the example embodiment shown, the mobile device 201 is a two-way mobile communication device having data and possibly also voice communication capabilities, and the capability to communicate with other computer systems, for example, via the Internet. Depending on the functionality provided by the mobile device 201, in various example embodiments the device 201 may be a data communication device, a multiple-mode communication device configured for both data and voice communication, a smartphone, a mobile telephone or a PDA (personal digital assistant) enabled for wireless communication, or a computer system with a wireless modem. It will be appreciated that, in some example embodiments, the systems and methods presented herein may be applied to an electronic device that does not, necessarily, have communication capabilities; such as, for example a PDA or GPS which is not enabled for communication.

The mobile device 201 includes at least one controller comprising at least one processor 240 such as a microprocessor which controls the overall operation of the mobile device 201, and a wireless communication subsystem 211 for exchanging radio frequency signals with a wireless network 101. The processor 240 interacts with the communication subsystem 211 which performs communication functions. The processor 240 interacts with additional device subsystems. In some example embodiments, the device 201 may include a touchscreen display 210 which includes a display (screen) 204, such as a liquid crystal display (LCD) screen, with a touch-sensitive input surface or overlay 206 connected to an electronic controller 208. The touch-sensitive overlay 206 and the electronic controller 208 provide a touch-sensitive input device and the processor 240 interacts with the touch-sensitive overlay 206 via the electronic controller 208. The touch-sensitive overlay 206 acts as an input mechanism 260, allowing the user of the device 201 to input commands to the processor 240.

In some example embodiments, the device 201 may include other input mechanisms 260 instead of or in addition to the touchscreen. The other input mechanisms may include, for example, a depressible scroll wheel (which may also be referred to as a trackball), a touch-pad such as an optical touchpad, an optical jog ball, and/or a physical keyboard.

It will be appreciated that the specific input mechanisms 260 associated with the device 201 will vary from device-to-device. That is, some devices 201 may have a first input mechanism 260 or first set of input mechanisms 260, while other devices 201 may have a second input mechanism 260 or second set of input mechanisms 260.

The processor 240 interacts with additional device subsystems including flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, input mechanisms 260, switch 261, short-range communication subsystem 272, and other device subsystems generally designated as 274. Some of the subsystems shown in FIG. 2 perform communication-related functions, whereas other subsystems may provide "resident" or on-device functions.

The communication subsystem 211 includes a receiver 214, a transmitter 216, and associated components, such as one or more antenna elements 218 and 221, local oscillators (LOs) 292, and a processing module such as a digital signal processor (DSP) 294. The antenna elements 218 and 221 may be embedded or internal to the mobile device 201 and a single antenna may be shared by both receiver and transmitter, as is known in the art. As will be apparent to those skilled in the field of communication, the particular design of the communication subsystem 211 depends on the wireless network 101 in which the mobile device 201 is intended to operate.

The mobile device 201 may communicate with any one of a plurality of fixed transceiver base stations (not shown) of the wireless network 101 within its geographic coverage area. The mobile device 201 may send and receive communication signals over the wireless network 101 after a network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 294. In a similar manner, signals to be transmitted are processed, including modulation and encoding, for example, by the DSP 294. These DSP-processed signals are input to the transmitter 216 for digital-to-analog (D/A) conversion, frequency up conversion, filtering, amplification, and transmission to the wireless network 101 via the antenna 221. The DSP 294 not only processes communication signals, but may also provide for receiver and transmitter control. For example, the gains applied to communication signals in the receiver 214 and the transmitter 216 may be adaptively controlled through automatic gain control algorithms implemented in the DSP 294.

The processor 240 operates under stored program control and executes software modules 220 stored in memory such as persistent memory; for example, in the flash memory 244. As illustrated in FIG. 2, the software modules 220 comprise operating system software 222 and applications 224.

The applications 224 may include an identity management system 223 which is configured to assign a globally unique identifier to an entity 160 within the ecosystem 150 (FIG. 1). The functions and features provided by the identity management system 223 will be discussed in greater detail below with reference to FIGS. 3 to 8.

The identity management system 223 may, in some example embodiments, be a stand-alone software application. In other example embodiments, the identity management system 223 may be provided as a module operating within another application 224. In at least some example embodiments, the identity management system 223 may be provided by the operating system 222.

Furthermore, while FIG. 2 illustrates an example embodiment in which the identity management system 223 is provided on the mobile device 201, in other example embodiments, identity management systems may be located at other locations in a communication network instead of or in addition to the mobile device 201. For example, referring for a moment to FIG. 1, identity management systems may be provided on any of the messaging server 132, content server 134, application server 136 or other servers 138. In at least some example embodiments (not shown), one of the other servers 138 provided in the communication system may be an identity management system server, which provides the functions of the identity management system 223.

Referring again to FIG. 2, the mobile device 201 may include other applications, which are not specifically illustrated in FIG. 2. These other applications may include, for example, a mapping application, a third party navigation application, an Internet browser application, an address book application, a messaging application, a calendar application, a notepad application, email message application, a push content viewing application, a voice communication (i.e. telephony) application, and a media player application. Each of the applications 224 may include layout information defining the placement of particular fields and graphic elements (e.g. text fields, input fields, icons, etc.) in the user interface (i.e. the display device 204). Other applications apart from those specifically listed above may also be provided.

The software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The memory may also store data 229, such as, for example, one or more data object 227 and a unique identification number associated with the mobile device 201, such as a PIN (Personal Identification Number) 225. The data object 227 is an entity 160 that can be manipulated by commands of a programming language. For example, the data object may, in various example embodiments, be a value, variable, function, or data structure.

The unique identification number may be a numerical or alphanumerical identifier which is associated with the device 201 and which is stored in memory of the device 201 at the time of manufacture of the device 201.

The applications 224 are, in at least some example embodiments, entities 160 within an ecosystem 150. Similarly, the data objects 227 may also be entities 160 within the ecosystem 150.

In some example embodiments, the auxiliary input/output (I/O) subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network. The auxiliary I/O subsystems 250 may comprise a vibrator for providing vibratory notifications in response to various events on the mobile device 201 such as receipt of a wireless communication or incoming phone call, or for other purposes such as haptic feedback (touch feedback).

The mobile device 201 also includes a storage memory 230. The storage memory may, in various example embodiments, be comprised of a removable memory card (typically comprising flash memory), such as, for example, a Secure Digital (SD), mini Secure Digital (miniSD), micro Secure Digital (microSD), or CompactFlash™ card. In some example embodiments, the storage memory 230 may be comprised of an internal (non-removable) memory which is designated by the operating system as storage memory. For example, the storage memory 230 may be e-MMC™ memory. The storage memory 230 is inserted in or connected to a storage memory interface 232 of the mobile device 201.

The serial data port 252 may be used for synchronization with a user's host computer system 117 (FIG. 1). The serial data port 252 enables a user to set preferences through an external device or software application and extends the capabilities of the mobile device 201 by providing for information or software downloads to the mobile device 201 other than through the wireless network 101. The alternate download path may, for example, be used to load an encryption key onto the mobile device 201 through a direct, reliable and trusted connection to thereby provide secure device communication.

The mobile device 201 also includes a battery 238 as a power source, which is typically one or more rechargeable batteries that may be charged, for example, through charging circuitry coupled to a battery interface 236, such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 272 is an additional optional component which provides for communication between the mobile device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications may be installed on the mobile device 201 during or after manufacture. Additional applications and/or upgrades to the operating system 221 or software applications 224 may also be loaded onto the mobile device 201 through the wireless network 101, the auxiliary I/O subsystem 250, the serial port 252, the short-range communication subsystem 272, or other suitable subsystem 274 other wireless communication interfaces. The downloaded programs or code modules may be permanently installed, for example, written into the flash memory 244, or written into and executed from the RAM 246 for execution by the processor 240 at runtime.

The mobile device 201 may, in some example embodiments, provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 204. A user of the mobile device 201 may also compose data items, such as email messages, for example, using the touch-sensitive overlay 206 in conjunction with the display device 204 and possibly other input mechanisms 260 and/or the auxiliary I/O subsystems 250. These composed items may be transmitted through the communication subsystem 211 over the wireless network 101.

In the voice communication mode, the mobile device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile wireless device 201. Although voice or audio signal output is typically accomplished primarily through the speaker 256, the display device 204 may also be used to provide an indication of the identity of a calling party, duration of a voice call, or other voice call related information.

From the above description of FIGS. 1 and 2, it will be understood that the mobile device ecosystem 150 may include a plurality of entities 160, such as, for example, devices 201, subscribers (not illustrated), applications 224, services (which may be provided by servers 132, 134, 136, 138), and data objects 227.

Other entities 160 may also be provided. For example, in at least some example embodiments, an entity 160 may be an author of an application. In other example embodiments, an entity 160 may be an application package. An application package is a means through which resources associated with an application may be identified and versioned, and through which dependencies are managed. The application package may describe different types of content included in an application.

In other example embodiments, an entity 160 may be an application archive. An application archive may be a file which aggregates (and possibly compresses) multiple resources associated with an application.

The number of entities within a mobile device ecosystem 150 may, in at least some open systems, constantly increase. For example, the number of entities may be increased when new mobile devices 201 are added to the ecosystem 150, when new applications 224 are added, and when new data objects 227 are created. As will be explained in greater detail below, the identity management system 223 may be configured to determine a globally unique identifier for an entity 160 within the ecosystem 150. The globally unique identifier may be used in order to allow for end-to-end identity based communications between devices, services, objects, and users.

It will be appreciated that, while the term mobile device ecosystem 150 has been described above to include entities which are not physically part of the mobile device 201, in other example embodiments, the ecosystem 150 may include only entities which are physically contained within the mobile device 201.

Creation of a Globally Unique Identifier

Figure 3:
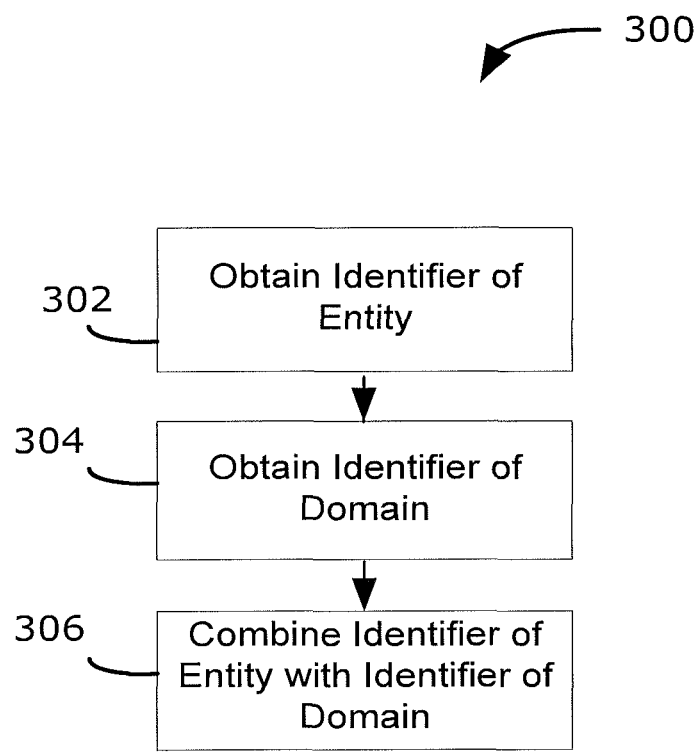
FIG. 3 is a flowchart illustrating a method for creating a globally unique identifier in accordance with example embodiments of the present disclosure.

Referring now to FIG. 3, a method 300 for assigning an identifier to an entity 160 (FIGS. 1 and 2) operating within a mobile device ecosystem 150 (FIG. 1) is illustrated.

In at least some example embodiments, the mobile device 201 (FIG. 2) may be configured to perform the method 300 of FIG. 3. More particularly, the identity management system 223 may be configured to cause one or more controllers of the device 201 (FIG. 2), such as the processor 240 (FIG. 2), to execute the steps of the method 300 of FIG. 3. In the following discussion of the method 300 of FIG. 3, all reference numerals which relate to device or system components (as opposed to steps of a process or method), such as processor 240, refer to components such as those illustrated, by example, in FIGS. 1 to 2.

Referring again to the method 300 of FIG. 3, in other example embodiments, another system, application, or module may be configured to perform the method 300 of FIG. 3.

For example, the method 300 may be performed by a server 138 (FIG. 1). More particularly, an identity management system 223 associated with the server 138 may be configured to cause one or more controllers of the server 138, such as a processor (not shown), to execute the steps of the method 300 of FIG. 3.

At 302, an identifier for an entity 160 (FIGS. 1 and 2), which uniquely identifies the entity 160 (FIGS. 1 and 2) within a domain, is obtained. A domain is a particular environment in which the identifier uniquely identifies the entity 160 (FIGS. 1 and 2). The domain for which the identifier uniquely identifies the entity 160 (FIGS. 1 and 2) does not generally include the whole mobile device ecosystem 150. Thus, while the identifier for the entity 160 (FIGS. 1 and 2) uniquely identifies the entity 160 (FIGS. 1 and 2) within a certain domain, it may not uniquely identify the entity 160 (FIGS. 1 and 2) within a mobile device ecosystem 150 (FIG. 1). That is, two entities within the mobile device ecosystem 150 (FIG. 1) may each have common identifiers which uniquely identify those entities within different domains.

The identifier which uniquely identifies the entity 160 (FIGS. 1 and 2) within the domain may, in some example embodiments, be obtained from memory at 302. For example, where the entity 160 (FIGS. 1 and 2) is a mobile device 201 (FIG. 2), the identifier which uniquely identifies the entity 160 (FIGS. 1 and 2) within the domain may be a PIN 225 (FIG. 2) which uniquely identifies the device 201 (FIG. 2) in a domain which consists of all devices deployed within the ecosystem 150 (FIG. 1) which are manufactured, designed and/or sold by a common entity 160 (FIGS. 1 and 2). For example, the PIN 225 may uniquely identify the device 201 (FIG. 2) in a domain which consists of all devices manufactured by a specific company.

In such example embodiments, at 302, the PIN 225 (or other unique identifier) may be obtained from a memory of the device 201.

In other example embodiments, and for other entities 160 of other entity types, at 302, an identifier of an entity 160 (FIGS. 1 and 2) may be obtained in another manner. For example, entities such as users and services may be identified according to a universally unique identifier ("UUID") method, which is used to generate a UUID.

The UUID is generated in a manner such that UUIDs generated at different times from the same name in the same namespace be equal. The UUID is also generated in a manner such that UUIDs generated from two different names in the same namespace be different (or at least that there is a very high probability that they are different). The UUID is also generated in a manner such that UUIDs generated from the same name in two different namespaces are different (or at least that there is a very high probability that they are different). The UUID is also generated in a manner such that, if two UUIDs that were generated from names are equal, then they were generated from the same name in the same namespace (or at least that there is a very high probability that they were generated from the same name in the same namespace).

For example, in at least some example embodiments, at least some entities may be uniquely identified in a domain using a UUID. The UUID may be determined by generating a name-based UUID from a hash generated from: the UUID for the namespace in which the name is unique, concatenated with the name for the entity 160 (FIGS. 1 and 2) being described, and all entities, being in network octet order. The hash is, in at least some example embodiments, an SHA-256 hash algorithm.

The algorithm for generating the UUID is, in at least some example embodiments, recursive. That is, a UUID for an entity 160 (FIGS. 1 and 2) in one context can form a namespace identifier for an entity 160 (FIGS. 1 and 2) in another context. Recursive namespaces allow for the generation of unique UUID's within a given context. For example, users associated with an enterprise may have a UUID assigned by the enterprise using a UUID that uses an enterprise UUID as the namespace.

As will be explained below, the identifier which uniquely identifies the entity 160 (FIGS. 1 and 2) within a domain may be combined with other information in order to uniquely identify an entity 160 (FIGS. 1 and 2) within an ecosystem 150 (FIG. 1).

Next, at 304 an identifier of the domain is obtained. The identifier of the domain uniquely identifies the domain within which the entity 160 (FIGS. 1 and 2) is unique. The identifier of the domain may be determined based on an entity type which is associated with the entity 160 (FIGS. 1 and 2). The entity type specifies the nature of the entity 160 (FIGS. 1 and 2). For example, the entity type may specify whether the entity is a device 201 (FIG. 2), subscriber, application, service, group, or data object. Other entity types are also possible.

The identifier of the domain may also be determined based on the protocol used to identify the entity 160 (FIGS. 1 and 2) within the domain. For example, the protocol may, in some example embodiments, be a PIN protocol. In other example embodiments, the protocol may be an Internet Protocol version 6 (IPv6). In other example embodiments, the protocol may be a UUID protocol, such as the protocol used to determine the UUID described above with reference to 302. Other protocols are also possible.

Each entity type and protocol pair may be assigned a unique identifier (i.e. a unique identifier of a domain). The unique identifier of a domain may be stored in a datastore located in memory of the device (FIG. 2). The datastore may, in some example embodiments, be a table. However, the datastore may be any organized collection of data. The datastore may be organized as a database in which case a datastore may comprise a single database or multiple databases. The database(s) may be a distributed database with data distributed between one or more multiple locations, including the electronic device (e.g., mobile communication device 201) and/or remote servers in communication with the electronic device.

By way of example, the following is a list of example identifiers of domains which may be associated with entity type-protocol pairs:

| Identifier of Domain | Entity | Protocol |
| --- | --- | --- |
| 0x00 | DEVICE | PIN |
| 0x03 | DEVICE | IPv6 |
| 0x10 | SUBSCRIBER | UUID |

It will be appreciated that other entity type-protocol pairs are also possible.

In at least some example embodiments, the identifier of the domain is expressed as a variable length integer. The use of variable length formatting allows for a compact globally unique identifier. That is, without the use of variable length formatting, the length of the identifier of the domain would be determined by a maximum possible length of identifiers of the domain.

Variable length integers use one or more octets to encode an unsigned integer of variable length in network octet order. In each octet of the identifier of the domain, a most significant bit is used to indicate whether that octet is the last octet in the variable length integer. That is, the most significant bit (MSB) is set to indicate that another octet of the identifier of the domain follows. The MSB of the last octet in the structure, however, remains cleared. Since the MSB is used to encode the integer length, the integer is unsigned.

A variable length integer may be determined for an integer as follows. In the following discussion, the value determined at each step for an unsigned integer value 6,746 will be placed in parenthesis following each step in order to better illustrate the steps. First, the value may be expressed in hex (1A5A ([0x1A][0x5A])). Next, the hex value may be converted into binary, separating the binary string into 7-bit segments (dropping any leading segments, which are all zeros) (0110100 1011010). Next each 7-bit segment may be written in the length structure with the MSB (now unused) set to 1, for all but the last octet (10110100 01011010 0xB4 0x5A).

An identifier of the domain may have a maximum length. In some example embodiments, the maximum length of a field which is used for the identifier of the domain is 4 octets. That is, 28 bits may be used for the identifier of the domain itself, and 4 bits may be used to encode the length of the identifier of the domain.

After both an identifier of an entity (at 302) and an identifier of a domain (at 304) are obtained, at 306 the identifier of the entity 160 (FIGS. 1 and 2) is combined with the identifier of the domain in order to create a globally unique identifier which uniquely identifies the entity 160 (FIGS. 1 and 2) in a plurality of domains. That is, the globally unique identifier may uniquely identify the entity 160 (FIGS. 1 and 2) in the mobile device ecosystem 150 (FIG. 1).

The globally unique identifier may be obtained by concatenating the identifier of the domain with the identifier of the entity 160 (FIGS. 1 and 2). The globally unique identifier may be represented as an array of octets. In at least some example embodiments, the globally unique identifier is obtained directly from the identifier of the entity and the identifier of the domain. That is, no transformation is applied to the combination of the identifier of the entity and the identifier of the domain in order to produce the globally unique identifier. A transformation is any conversion which destroys data, such as, for example, a hash. Since such transformations are not applied, the identifier of the domain and the identifier of the entity may later be determined (i.e. extracted) from the globally unique identifier. That is, no information is lost.

In order to accommodate variations in the sizes of identifiers of entities (such as those which may already be defined for entities in legacy systems), in at least some example embodiments, a length of the identifier of the entity 160 (FIGS. 1 and 2) may be determined and included in the globally unique identifier. The length of the identifier may also be used to extract the identifier of an entity 160 (FIGS. 1 and 2) which is unique to a domain from the globally unique identifier.

Figure 4:
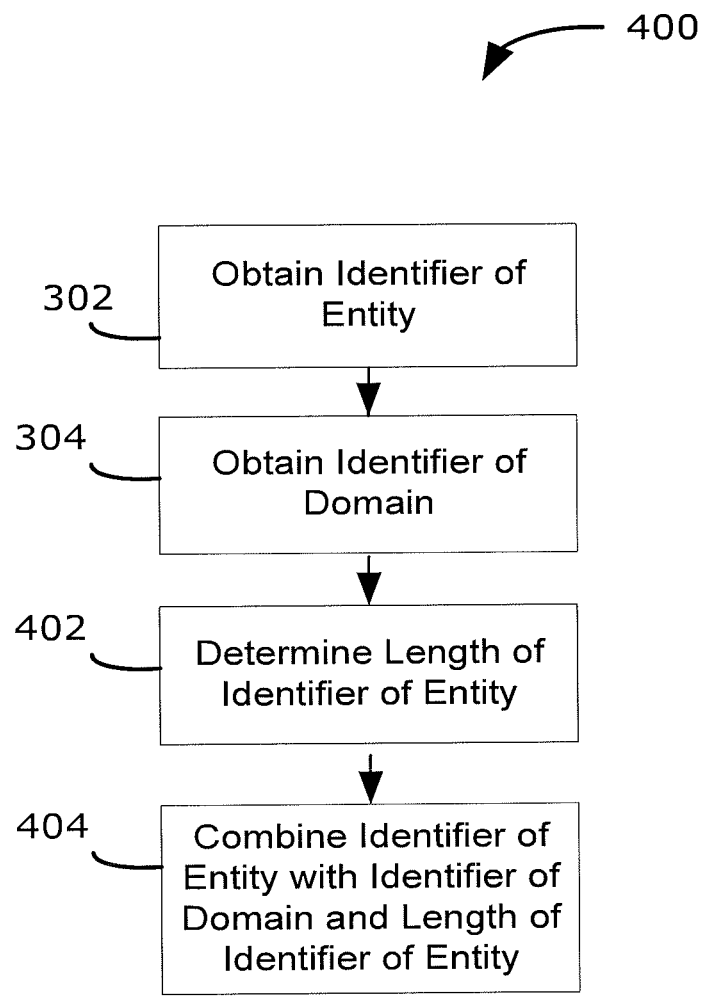
FIG. 4 is a flowchart illustrating a method for creating a globally unique identifier in accordance with example embodiments of the present disclosure.

Referring now to FIG. 4, a method 400 for assigning an identifier to an entity 160 (FIGS. 1 and 2) operating within a mobile device ecosystem 150 (FIG. 1) according to further example embodiments is illustrated. In the example embodiment of FIG. 4, the globally unique identifier is configured to include information identifying the length of the identifier of the entity 160 (FIGS. 1 and 2).

In at least some example embodiments, the mobile device 201 (FIG. 2) may be configured to perform the method 400 of FIG. 4. More particularly, the identity management system 223 may be configured to cause one or more controllers of the device 201 (FIG. 2), such as the processor 240 (FIG. 2), to execute the steps of the method 400 of FIG. 4. In the following discussion of the method 400 of FIG. 4, all reference numerals which relate to device 201 (FIG. 2) or system components (as opposed to steps of a process or method), such as processor 240, refer to components such as those illustrated, by example, in FIGS. 1 to 2.

In other example embodiments, another system, application, or module may be configured to perform the method 400 of FIG. 4. For example, the method 400 may be performed by a server 138 (FIG. 1). More particularly, an identity management system 223 associated with the server 138 may be configured to cause one or more controllers of the server 138, such as a processor (not shown), to execute the steps of the method 400 of FIG. 4.

First, at 302, an identifier for an entity 160 (FIGS. 1 and 2), which uniquely identifies the entity within a domain, is obtained in the manner discussed above with reference to FIG. 3.

Next, at 304, an identifier of the domain is obtained in the manner discussed above with reference to FIG. 3. The identifier of the domain uniquely identifies the domain within which the entity 160 (FIGS. 1 and 2) is unique.

Next, at 402, a length of the identifier of the entity 160 (FIGS. 1 and 2) which uniquely identifies the entity 160 (FIGS. 1 and 2) within a domain is obtained for inclusion in the globally unique identifier. The length of the identifier may be represented as an octet. A single octet length field permits identifiers of up to 255 octets in length.

Next, at 404, after an identifier of an entity (at 302), an identifier of the domain (at 304), and a length of the identifier of the entity (at 402) are obtained, at 404 the identifier of the entity 160 (FIGS. 1 and 2) is combined with the identifier of the domain and the length of the identifier of the entity 160 (FIGS. 1 and 2) in order to create a globally unique identifier which uniquely identifies the entity 160 (FIGS. 1 and 2) across a plurality of domains. That is, the globally unique identifier may uniquely identify the entity 160 (FIGS. 1 and 2) in the mobile device ecosystem 150 (FIG. 1). The globally unique identifier is formatted in a manner which permits the identifier of the entity 160 (FIGS. 1 and 2), which uniquely identifies the entity 160 (FIGS. 1 and 2) in a domain, to be located and/or extracted from the globally unique identifier. The globally unique identifier is also formatted in a manner which permits the identifier of the domain to be located and/or extracted from the globally unique identifier. This may be done, for example, by including length information for any information included within the globally unique identifier which is of a variable length (i.e. a length for the identifier of the entity 160 (FIGS. 1 and 2) which uniquely identifies the entity 160 (FIGS. 1 and 2) in a domain and a length for the identifier of the domain).

In at least some example embodiments, at 404, a globally unique identifier may be formed by concatenating the identifier of the domain with the length of the entity 160 (FIGS. 1 and 2) and the identifier of the entity 160 (FIGS. 1 and 2) which is unique within the domain. For example, the globally unique identifier may be formed by concatenating the following:

<Identifier of Domain> <Length of Identifier of Entity><Identifier of Entity>;

Where <Identifier of Domain> is the identifier of the domain (determined at 304), and may be represented as a variable length integer which has length information encoded therein which may be used to determine the length of the identifier of the domain;

<Length of Identifier of Entity> is the length of the identifier of the entity 160 (FIGS. 1 and 2) which uniquely identifies the entity 160 (FIGS. 1 and 2) in the domain (determined at 404) and which may be represented in octet form; and <Identifier of Entity> is the identifier of the entity 160 (FIGS. 1 and 2) which uniquely identifies the entity 160 (FIGS. 1 and 2) within the domain (determined at step 302) and which may be represented as a variable length octet string.

In order to permit the <Identifier of the Entity> to be extracted or identified from the globally unique identifier, information regarding the length of the identifier of the entity 160 (i.e. <Length of Identifier of Entity>) may be represented in a manner in which a size of the information regarding the length of the identifier of the entity field is fixed. For example, the length of the identifier of the entity 160 (FIGS. 1 and 2) may be represented using a predetermined number of octets. In at least some example embodiments, one octet will always be used to specify the length of the identifier of the entity 160 (FIGS. 1 and 2).

The globally unique identifier may be represented as an array of octets.

Figure 5:
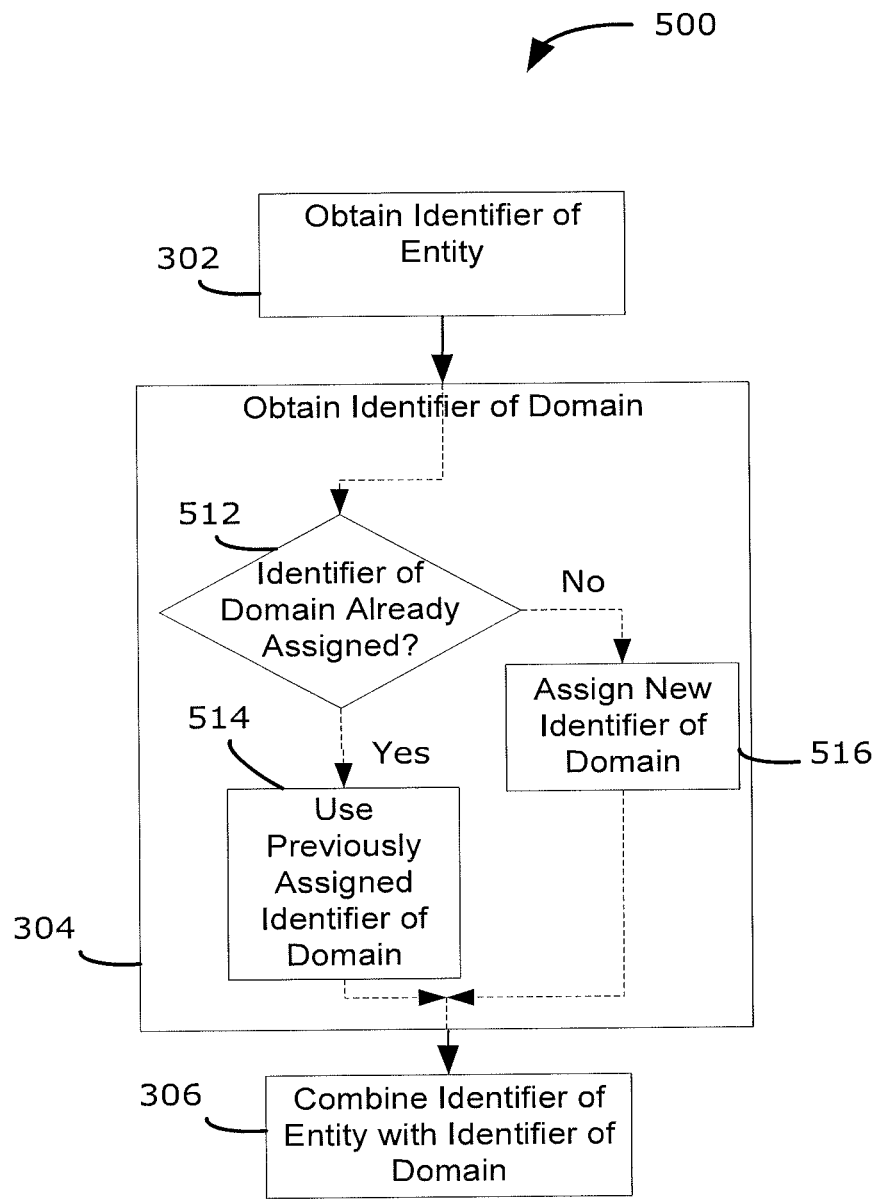
FIG. 5 is a flowchart illustrating a method for creating a globally unique identifier in accordance with example embodiments of the present disclosure.

Referring now to FIG. 5, a method 500 for assigning an identifier to an entity 160 (FIGS. 1 and 2) operating within a mobile device ecosystem 150 (FIG. 1) according to further example embodiments is illustrated.

In at least some example embodiments, the mobile device 201 (FIG. 2) may be configured to perform the method 500 of FIG. 5. More particularly, the identity management system 223 may be configured to cause one or more controllers of the device 201 (FIG. 2), such as the processor 240 (FIG. 2), to execute the steps of the method 500 of FIG. 5. In the following discussion of the method 500 of FIG. 5, all reference numerals which relate to device (FIG. 2) or system components (as opposed to steps of a method or method), such as processor 240, refer to components such as those illustrated, by example, in FIGS. 1 to 2.

In other example embodiments, another system, application, or module may be configured to perform the method 500 of FIG. 5. For example, the method 500 may be performed by a server 138 (FIG. 1). More particularly, an identity management system 223 associated with the server 138 may be configured to cause one or more controllers of the server 138, such as a processor (not shown), to execute the steps of the method 500 of FIG. 5.

First, at 302, an identifier for an entity 160 (FIGS. 1 and 2), which uniquely identifies the entity 160 (FIGS. 1 and 2) within a domain, is obtained in the manner discussed above with reference to FIG. 3.

Next, at 304, an identifier of the domain is obtained. The identifier of the domain uniquely identifies the domain within which the entity 160 (FIGS. 1 and 2) is unique.

304 includes a number of sub-steps and procedures. At 512, a determination is made regarding whether the domain in which the entity 160 (FIGS. 1 and 2) is located has already been assigned an identifier. This may be done, for example, by consulting a datastore to determine whether an identifier has already been assigned to an entity type and protocol pair which is associated with the entity 160 (FIGS. 1 and 2). The use of entity type and protocol pairs is discussed in greater detail above with reference to step 304 of FIG. 3.

If an identifier has already been assigned to the domain, then that identifier may be used as the identifier of the domain (at 514). If, however, an identifier has not already been assigned to the domain (i.e. if the entity 160 (FIGS. 1 and 2) is described in a domain which has not yet been assigned an identifier, such as a new domain defined by a new protocol or new entity type), then at 516 an identifier of the domain is assigned to the domain. Allocations of identifiers of domains may, in some example embodiments, be sequential. In other example embodiments, allocation of descriptors will not be sequential in order to satisfy sizing constraints for various entity types. However, in either case, assigning an identifier to a new domain may include determining a next available identifier of a domain and assigning that identifier to the domain.

At 516, when the identifier is assigned to the new domain, the datastore which maps identifiers of domains to entity-type and protocol pairs may be updated to store the association between the identifier of the new domain and its associated entity-type and protocol.

After both an identifier of an entity (at 302) and an identifier of a domain (at 304) are obtained, at 306 the identifier of the entity 160 (FIGS. 1 and 2) is combined with the identifier of the domain in order to create a globally unique identifier which uniquely identifies the entity 160 (FIGS. 1 and 2) across a plurality of domains. The creation of the identifier of the globally unique identifier is discussed in greater detail above with reference to FIG. 3.

After globally unique identifiers are obtained, such globally unique identifiers may be used for various purposes. For example, the globally unique identifiers may, in some example embodiments, be used to provide end-to-end communication between entities.

Figure 6:
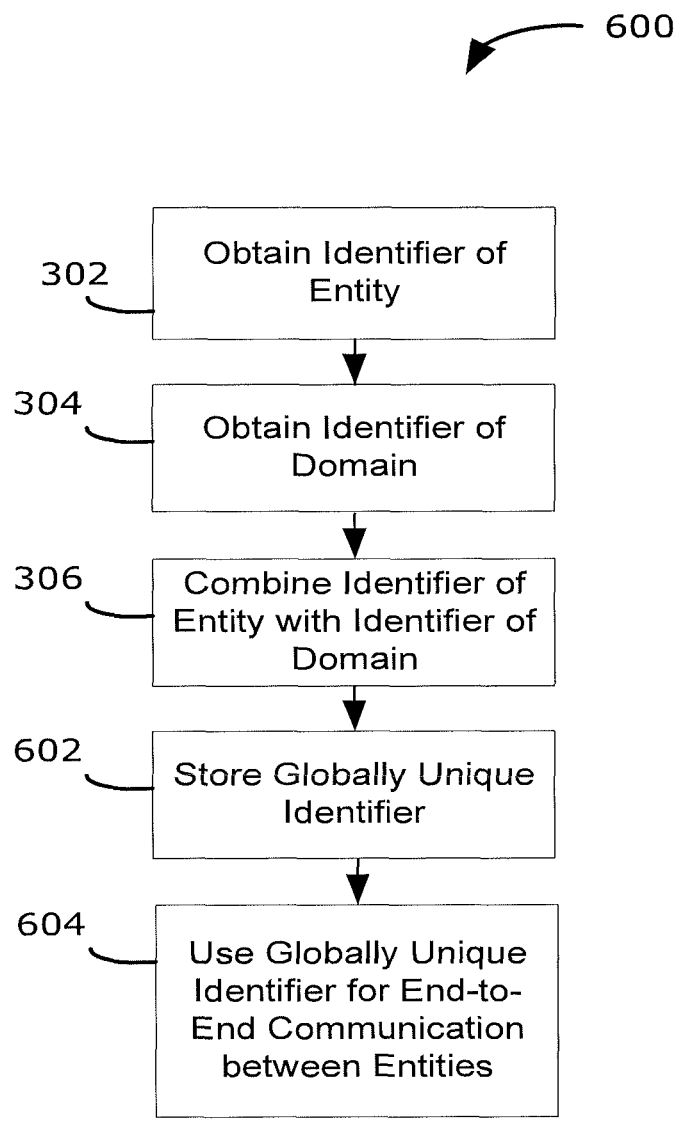
FIG. 6 is a flowchart illustrating a method for creating a globally unique identifier in accordance with example embodiments of the present disclosure.

Referring now to FIG. 6, one such example embodiment will be discussed. FIG. 6 illustrates a method 600 for assigning an identifier to an entity 160 (FIGS. 1 and 2) operating within a mobile device ecosystem 150 (FIG. 1) according to further example embodiments.

In at least some example embodiments, the mobile device 201 (FIG. 2) may be configured to perform the method 600 of FIG. 6. More particularly, the identity management system 223 may be configured to cause one or more controllers of the device 201 (FIG. 2), such as the processor 240 (FIG. 2), to execute the steps of the method 600 of FIG. 6, In the following discussion of the method 600 of FIG. 6, all reference numerals which relate to device 201 (FIG. 2) or system components (as opposed to steps of a process or method), such as processor 240, refer to components such as those illustrated, by example, in FIGS. 1 to 2.

In other example embodiments, another system, application, or module may be configured to perform the method 600 of FIG. 6. For example, the method 600 may be performed by a server 138 (FIG. 1). More particularly, an identity management system 223 associated with the server 138 may be configured to cause one or more controllers of the server 138, such as a processor (not shown), to execute the steps of the method 600 of FIG. 6.

First, at 302, an identifier for an entity 160 (FIGS. 1 and 2), which uniquely identifies the entity 160 (FIGS. 1 and 2) within a domain, is obtained in the manner discussed above with reference to FIG. 3.

Next, at 304, an identifier of the domain is obtained in the manner discussed above with reference to FIG. 3 or FIG. 5. The identifier of the domain uniquely identifies the domain within which the entity 160 (FIGS. 1 and 2) is unique.

Next, at 306, a globally unique identifier is created in the manner discussed above with reference to FIG. 3 or FIG. 4.

At 602, the globally unique identifier may, in some example embodiments, be stored in a memory. For example, the globally unique identifier may be stored in a memory of the mobile device 201.

At 604, in at least some example embodiments, the globally unique identifier may be used for end-to-end communication between entities. That is, an entity 160 (FIGS. 1 and 2) may send data to another entity (through a router or other connection(s) between two entities within mobile device ecosystem 150) associated with the mobile device ecosystem 150 (The other entity may be a software module or application provided on the mobile device or on another server or system). The data may, in some example embodiments, be a message, command or instruction. By specifying the entity 160 (FIGS. 1 and 2) which is to receive the data in terms of the globally unique identifier associated with that recipient entity 160 (FIGS. 1 and 2), the probability that the data is routed to the proper recipient entity 160 (FIGS. 1 and 2) is increased.

Figure 7:
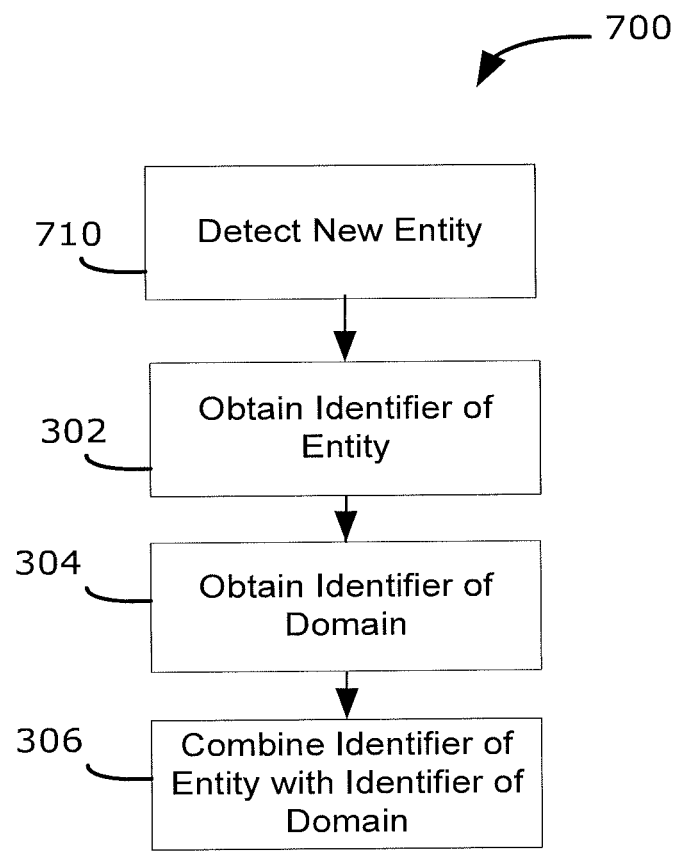
FIG. 7 is a flowchart illustrating a method for creating a globally unique identifier in accordance with example embodiments of the present disclosure.

In at least some example embodiments, globally unique identifiers may be assigned to entities when new entities enter the mobile device ecosystem 150 (FIG. 1). Once such example embodiment is illustrated in FIG. 7. FIG. 7 illustrates a method 700 for assigning an identifier to an entity 160 (FIGS. 1 and 2) operating within a mobile device ecosystem 150 (FIG. 1).

In at least some example embodiments, the mobile device 201 (FIG. 2) may be configured to perform the method 700 of FIG. 7. More particularly, the identity management system 223 may be configured to cause one or more controllers of the device 201 (FIG. 2), such as the processor 240 (FIG. 2), to execute the steps of the method 700 of FIG. 7. In the following discussion of the method 700 of FIG. 7, all reference numerals which relate to device 201 (FIG. 2) or system components (as opposed to steps of a process or method), such as processor 240, refer to components such as those illustrated, by example, in FIGS. 1 to 2.

In other example embodiments, another system, application, or module may be configured to perform the method 700 of FIG. 7. For example, the method 700 may be performed by a server 138 (FIG. 1). More particularly, an identity management system 223 associated with the server 138 may be configured to cause one or more controllers of the server 138, such as a processor (not shown), to execute the steps of the method 700 of FIG. 7.

In FIG. 7, at 710, it is determined that a new entity 160 (FIGS. 1 and 2) has joined the mobile device ecosystem 150 (FIG. 1). In response to determining that a new entity 160 (FIGS. 1 and 2) has joined the ecosystem 150 (FIG. 1), a globally unique identifier is assigned to the new entity 160 (FIGS. 1 and 2).

That is, at 302, an identifier for an entity 160 (FIGS. 1 and 2), which uniquely identifies the entity 160 (FIGS. 1 and 2) within a domain, is obtained in the manner discussed above with reference to FIGS. 3 to 6.

Next, at 304, an identifier of the domain is obtained in the manner discussed above with reference to FIG. 3 to FIG. 6. The identifier of the domain uniquely identifies the domain within which the entity 160 (FIGS. 1 and 2) is unique.

Next, at 306, a globally unique identifier is created in the manner discussed above with reference to FIG. 3 to FIG. 6.

Figure 8:
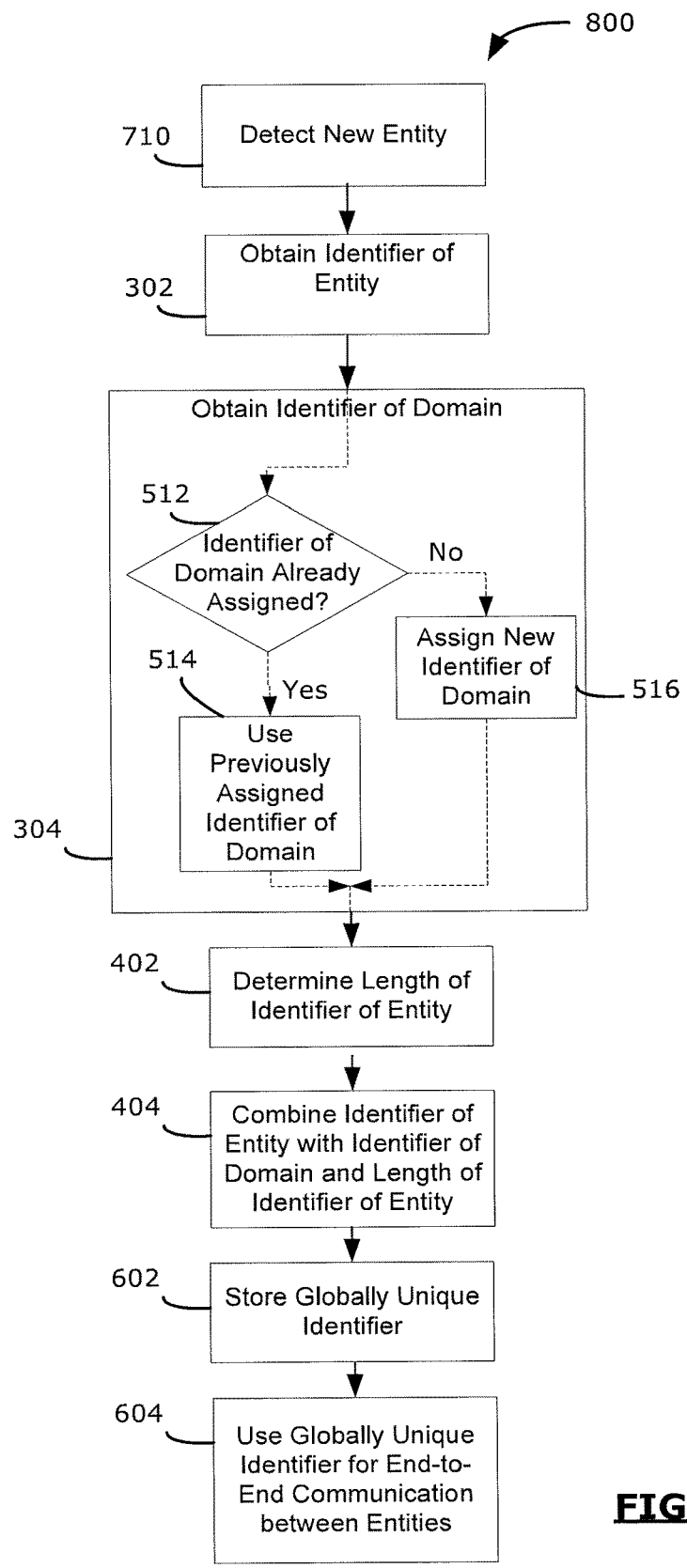
FIG. 8 is a flowchart illustrating a method for creating a globally unique identifier in accordance with example embodiments of the present disclosure.

The features discussed with reference to FIGS. 3 to 7 may, in some example embodiments, be included in a larger process, which includes features of any two or more of the processes 300, 400, 500, 600 or 700 of FIGS. 3 to 7. By way of example, one such method 800 is illustrated in FIG. 8. FIG. 8 illustrates a method 800 for assigning an identifier to an entity 160 (FIGS. 1 and 2) operating within a mobile device ecosystem 150 (FIG. 1) according to further example embodiments.

In at least some example embodiments, the mobile device 201 (FIG. 2) may be configured to perform the method 800 of FIG. 8. More particularly, the identity management system 223 may be configured to cause one or more controllers of the device 201 (FIG. 2), such as the processor 240 (FIG. 2), to execute the steps of the method 800 of FIG. 8. In the following discussion of the method 800 of FIG. 8, all reference numerals which relate to device 201 (FIG. 2) or system components (as opposed to steps of a process or method), such as processor 240, refer to components such as those illustrated, by example, in FIGS. 1 to 2.

In other example embodiments, another system, application, or module may be configured to perform the method 800 of FIG. 8. For example, the method 800 may be performed by a server 138 (FIG. 1). More particularly, an identity management system 223 associated with the server 138 may be configured to cause one or more controllers of the server 138, such as a processor (not shown), to execute the steps of the method 800 of FIG. 8.

First, at 710, a new entity 160 (FIGS. 1 and 2) is detected in the mobile device ecosystem 150 (FIG. 1) in the manner described above with reference to FIG. 7.

Next, at 302, an identifier for an entity 160 (FIGS. 1 and 2), which uniquely identifies the entity 160 (FIGS. 1 and 2) within a domain, is obtained in the manner discussed above with reference to FIG. 3.

Next, at 304, an identifier of the domain is obtained in the manner discussed above with reference to FIG. 3 or FIG. 5. At 512, a determination is made regarding whether the domain in which the entity 160 (FIGS. 1 and 2) is located has already been assigned an identifier. 512 is discussed in greater detail above with reference to FIG. 5. If an identifier has already been assigned to the domain, then that identifier may be used as the identifier of the domain (at 514). If, however, an identifier has not already been assigned to the domain (i.e. if the entity 160 (FIGS. 1 and 2) is described in a domain which has not yet been assigned an identifier, such as a new domain defined by a new protocol or new entity type), then at 516 an identifier of the domain is assigned to the domain. 514 and 516 are discussed in greater detail above with reference to FIG. 5.

Next, at 402, a length of the identifier of the entity 160 (FIGS. 1 and 2) which uniquely identifies the entity 160 (FIGS. 1 and 2) within a domain is obtained for inclusion in the globally unique identifier, in the manner described above with reference to FIG. 4.

Next, at 404, after an identifier of an entity (at 302), an identifier of the domain (at 304), and a length of the identifier of the entity (at 402) are obtained, at 404 the identifier of the entity 160 (FIGS. 1 and 2) is combined with the identifier of the domain and the length of the identifier of the entity 160 (FIGS. 1 and 2) in order to create a globally unique identifier which uniquely identifies the entity 160 (FIGS. 1 and 2) in a plurality of domains. Step 404 is described in greater detail above with reference to FIG. 4.

At 602, the globally unique identifier may, in some example embodiments, be stored in a memory. For example, the globally unique identifier may be stored in a memory of the mobile device 201.

At 604, in at least some example embodiments, the globally unique identifier may be used for end-to-end communication between entities, in the manner described above with reference to FIG. 6.

In accordance with further example embodiments of the present disclosure, a development tool is provided for creating globally unique identifiers which are globally unique within a mobile device ecosystem 150 (FIG. 1). The development tool may be used by developers to develop applications for use in the mobile device ecosystem 150 (FIG. 1). The development tool may be provided as a software module operating on a computer system. The software module may be configured to perform the methods described with reference to any of FIGS. 3 to 8.

In accordance with a further example embodiment of the present disclosure, there is provided an application which communicates with other entities (such as other applications) using globally unique identifiers determined in the manner described herein.

In accordance with further example embodiments of the present disclosure, there are provided a computer program product comprising a computer readable medium having stored thereon computer executable instructions comprising instructions for practising the methods of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

While the present disclosure is primarily described as a method, a person of ordinary skill in the art will understand that the present disclosure is also directed to various apparatus such as a mobile wireless device for carrying out at least some of the aspects and features of the described methods and including components for performing at least some of the described method steps, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

FIGS. 3 to 8 are flowcharts of example embodiment methods. Some of the steps illustrated in the flowchart may be performed in an order other than that which is described. Also, it should be appreciated that not all of the steps described in the flow chart are required to be performed, that additional steps may be added, and that some of the illustrated steps may be substituted with other steps.

The invention claimed is:

1. A method of assigning an identifier to a first entity operating within a mobile device ecosystem the method comprising:
   obtaining an identifier of a first entity which uniquely identifies the first entity within a first domain in a plurality of domains in the mobile device ecosystem, each domain including a plurality of entities, each entity having an identifier that is unique within its respective domain but which may not be unique across the plurality of domains, wherein the identifier of the first entity comprises a number of octets and represents a personal identification number (PIN) that uniquely identifies a device within a domain that consists of all devices of a particular make or a universally unique identifier (UUID);
   determining a length of the identifier of the first entity, wherein the length of the identifier of the first entity is represented by a single octet;
   determining an identifier of the first domain which uniquely identifies the first domain within the mobile device ecosystem based on a combination of an entity type of the first entity and a protocol used to identify the first entity within the first domain, wherein the protocol is one of a PIN protocol, UUID protocol or Internet Protocol version 6 (IPv6) protocol, wherein the identifier of the first domain comprises a variable length integer, wherein the variable length integer includes one or more octets which encode an unsigned integer of a variable length, wherein a most significant bit of each octet indicates whether that octet is the last octet in the variable length integer;
   concatenating the identifier of the first entity with the length of the identifier of the first entity and the identifier of the first domain to create a globally unique identifier of the first entity which is globally unique in the mobile device ecosystem, wherein the globally unique identifier is represented as an array of octets;
   storing the globally unique identifier in a memory associated with an identity management system module; and
   exchanging communications between the first entity and a second entity, wherein the communications specify the first entity using the globally unique identifier of the first entity stored in the identity management system module and specify the second entity using a globally unique identifier of the second entity stored in the identity management system module.

2. The method of claim 1, further comprising, prior to obtaining the identifier of the first entity:
   determining that the first entity is a new entity which has joined the mobile device ecosystem and, in response, performing the steps of obtaining the identifier of the first entity, determining the identifier of the first domain and combining the identifier of the first entity with the identifier of the first domain.

3. The method of claim 1, wherein the first entity is a mobile device operating within the mobile device ecosystem, and wherein the mobile device has a mobile device identifier stored in a memory of the mobile device, and the mobile device identifier uniquely identifies the mobile device within the mobile device ecosystem, and wherein obtaining the identifier of the first entity includes retrieving the mobile device identifier from the memory of the mobile device.

4. The method of claim 1, wherein determining the identifier of the first domain comprises:
   determining, from a datastore mapping identifiers of domains to entity type and protocol pairs, the entity type being a category of the entity in the ecosystem, the datastore including a plurality of protocols and a plurality of entity categories, whether an identifier has already been assigned for the entity type and protocol pair defining the first domain; and
   if an identifier has not already been assigned for the entity type and protocol pair defining the first domain, assigning a next available identifier to the entity type and protocol pair defining the first domain and updating the datastore to store the association between the assigned next available identifier and the entity type and protocol pair defining the first domain.

5. The method of claim 1, wherein obtaining the identifier of the first entity comprises:
   applying an SHA-256 hashing algorithm to a name and a namespace associated with the first entity to obtain the identifier of the first entity.

6. An electronic device comprising:
   a processor; and
   a memory having stored thereon an identity management system module, the identity management system module being configured to cause the processor to:
      obtain an identifier of a first entity which uniquely identifies a first entity within a first domain, the first entity being part of a first domain in a plurality of domains in a mobile device ecosystem, each domain including a plurality of entities, each entity having an identifier that is unique within its respective domain but which may not be unique across the plurality of domains, wherein the identifier of the first entity comprises a number of octets and represents a personal identification number (PIN) that uniquely identifies a device within a domain that consists of all devices of a particular make or a universally unique identifier (UUID);
      determine a length of the identifier of the first entity, wherein the length of the identifier of the first entity is represented by a single octet;
      determine an identifier of the first domain which uniquely identifies the first domain within the mobile device ecosystem based on a combination of an entity type of the first entity and a protocol used to identify the first entity within the first domain, wherein the protocol is one of a PIN protocol, UUID protocol or Internet Protocol version 6 (IPv6) protocol, wherein the identifier of the first domain comprises a variable length integer, wherein the variable length integer includes one or more octets which encode an unsigned integer of a variable length, wherein a most significant bit of each octet indicates whether that octet is the last octet in the variable length integer;
      concatenate the identifier of the first entity with the identifier of the first domain to create a globally unique identifier of the first entity which is globally unique in the mobile device ecosystem, wherein the globally unique identifier is represented as an array of octets;

store the globally unique identifier in the memory in association with the identity management system module; and exchange communications between the first entity and a second entity, wherein the communications specify the first entity using the globally unique identifier of the first entity stored in the identity management system module and specify the second entity using a globally unique identifier of the second entity stored in the identity management system module.

7. The electronic device of claim 6, wherein the identity management system module is further configured to cause the processor to, prior to obtaining the identifier of the first entity:

determine that the first entity is a new entity which has joined the mobile device ecosystem and, in response, perform the steps of obtaining the identifier of the first entity, determining the identifier of the first domain and combining the identifier of the first entity with the identifier of the first domain.

8. The electronic device of claim 6, wherein the first entity is a mobile device operating within the mobile device ecosystem, and wherein the mobile device has a mobile device identifier stored in a memory of the mobile device, and the mobile device identifier uniquely identifies the mobile device within the mobile device ecosystem, and wherein obtaining the identifier of the first entity includes retrieving the mobile device identifier stored in the memory of the mobile device.

9. The electronic device of claim 6, wherein obtaining the identifier of the first domain comprises:

determining, from a datastore mapping identifiers of domains to entity type and protocol pairs, the entity type being a category of the entity in the ecosystem, the datastore including a plurality of protocols and a plurality of entity categories, whether an identifier has already been assigned for the entity type and protocol pair defining the first domain; and if an identifier has not already been assigned for the entity type and protocol pair defining the first domain, assigning a next available identifier to the entity type and protocol pair defining the first domain and updating the datastore to store the association between the assigned next available identifier and the entity type and protocol pair defining the first domain.

10. The electronic device of claim 6, wherein obtaining the identifier of the first entity comprises:

applying an SHA-256 hashing algorithm to a name and a namespace associated with the first entity to obtain the identifier of the first entity.

11. A non-transitory machine readable medium having tangibly stored thereon executable instructions for execution by a processor of an electronic device, wherein the executable instructions, when executed by the processor of the electronic device, cause the processor to:

obtain an identifier of a first entity which uniquely identifies a first entity within a first domain, the first entity being part of a first domain in a plurality of domains in a mobile device ecosystem, each domain including a plurality of entities, each entity having an identifier that is unique within its respective domain but which may not be unique across the plurality of domains, wherein the identifier of the first entity comprises a number of octets and represents a personal identification number (PIN) that uniquely identifies a device within a domain that consists of all devices of a particular make or a universally unique identifier (UUID);

determine a length of the identifier of the first entity, wherein the length of the identifier of the first entity is represented by a single octet;

determine an identifier of the first domain which uniquely identifies the first domain within the mobile device ecosystem based on a combination of an entity type of the first entity and a protocol used to identify the first entity within the first domain, wherein the protocol is one of a PIN protocol, UUID protocol or Internet Protocol version 6 (IPv6) protocol, wherein the identifier of the first domain comprises a variable length integer, wherein the variable length integer includes one or more octets which encode an unsigned integer of a variable length, wherein a most significant bit of each octet indicates whether that octet is the last octet in the variable length integer;

concatenate the identifier of the first entity with the identifier of the first domain to create a globally unique identifier of the first entity which is globally unique in the mobile device ecosystem, wherein the globally unique identifier is represented as an array of octets;

store the globally unique identifier in the memory in association with a identity management system module; and exchange communications between the first entity and a second entity, wherein the communications specify the first entity using the globally unique identifier of the first entity stored in the identity management system module and specify the second entity using a globally unique identifier of the second entity stored in the identity management system module.

12. The method of claim 1, further comprising identifying a length of the identifier of the first entity, and combining data specifying the length of the identifier of the first entity with the identifier of the first entity and the identifier of the first domain to create the globally unique identifier of the first entity.

13. The electronic device of claim 6, wherein the identity management system module is further configured to cause the processor to identify a length of the identifier of the first entity, and combine data specifying the length of the identifier of the first entity with the identifier of the first entity and the identifier of the first domain to create the globally unique identifier of the first entity.

14. The non-transitory machine readable medium of claim 11, wherein the executable instructions, when executed by the processor of the electronic device, cause the processor to identify a length of the identifier of the first entity, and combine data specifying the length of the identifier of the first entity with the identifier of the first entity and the identifier of the first domain to create the globally unique identifier of the first entity.

15. The non-transitory machine readable medium of claim 11, wherein the executable instructions, when executed by the processor of the electronic device, cause the processor to, prior to obtaining the identifier of the first entity:

determine that the first entity is a new entity which has joined the mobile device ecosystem and, in response, perform the steps of obtaining the identifier of the first entity, determining the identifier of the first domain and combining the identifier of the first entity with the identifier of the first domain.

16. The non-transitory machine readable medium of claim 11, wherein obtaining the identifier of the first domain comprises:
   determining, from a datastore mapping identifiers of domains to entity type and protocol pairs, the entity type being a category of the entity in the ecosystem, the datastore including a plurality of protocols and a plurality of entity categories, whether an identifier has already been assigned for the entity type and protocol pair defining the first domain; and
   if an identifier has not already been assigned for the entity type and protocol pair defining the first domain, assigning a next available identifier to the entity type and protocol pair defining the first domain and updating the datastore to store the association between the assigned next available identifier and the entity type and protocol pair defining the first domain.

17. The electronic device of claim 6, wherein the electronic device is a server.

18. The method of claim 1, wherein the identifier of the first domain comprises a maximum length of 4 octets.

19. The method of claim 18, wherein up to 28 bits encode the identifier of the first domain and up to 4 bits encode the length of the identifier of the first domain.

* * * * *